June 28, 1938.  E. S. GANDRUD  2,121,867
LAND MEASURING INSTRUMENT
Filed Aug. 20, 1936  4 Sheets-Sheet 2
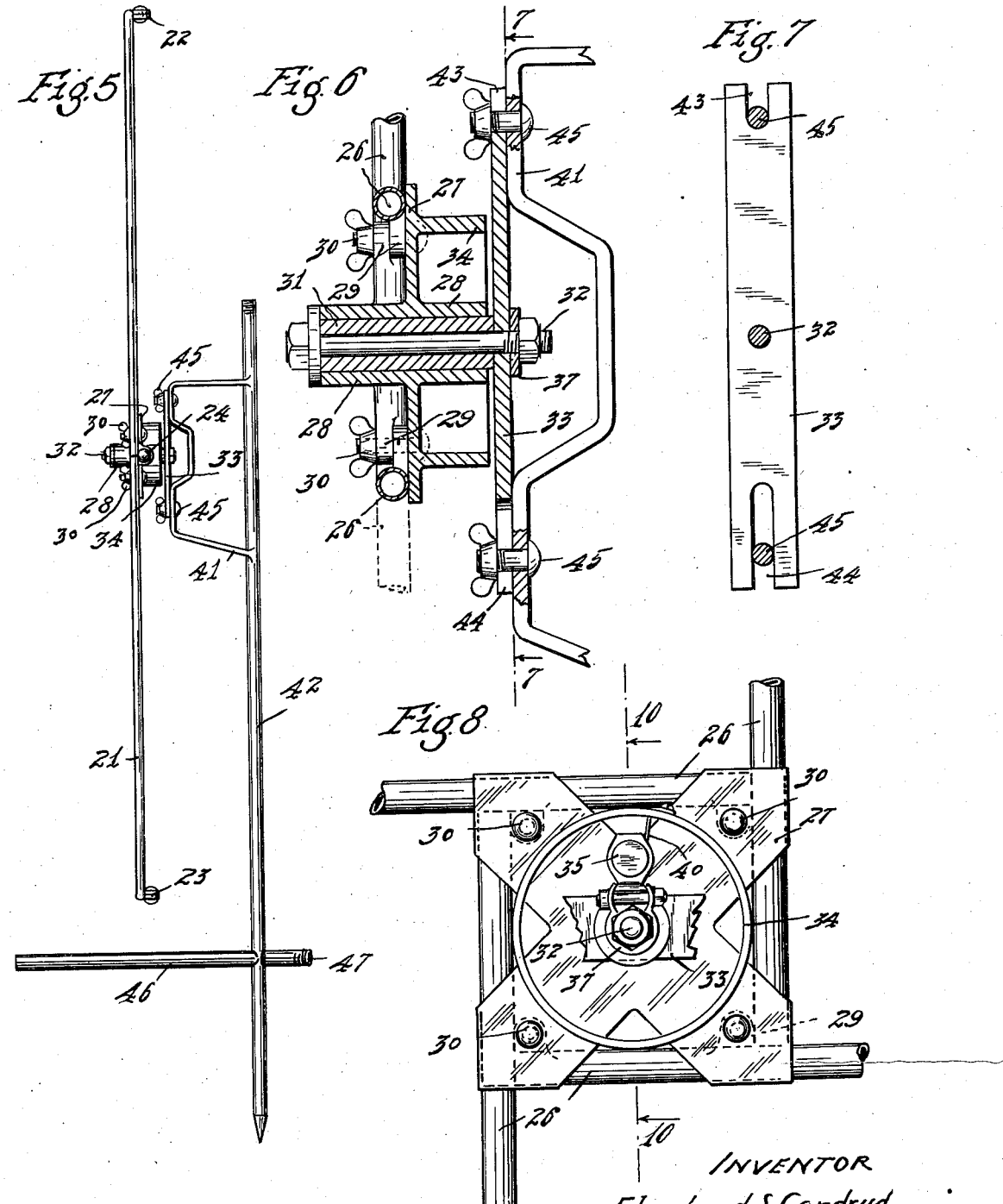

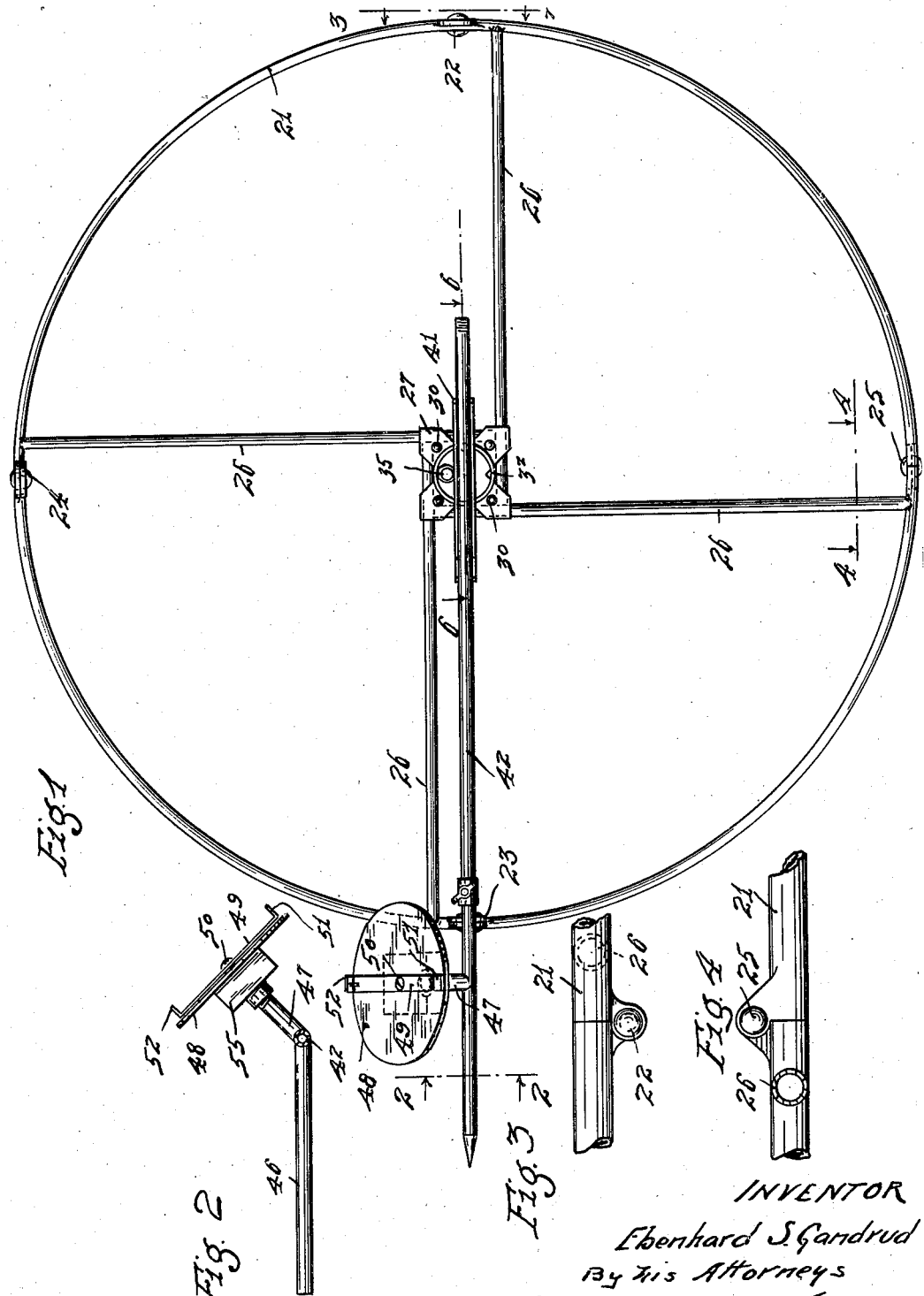

June 28, 1938. E. S. GANDRUD 2,121,867
LAND MEASURING INSTRUMENT
Filed Aug. 20, 1936  4 Sheets-Sheet 3
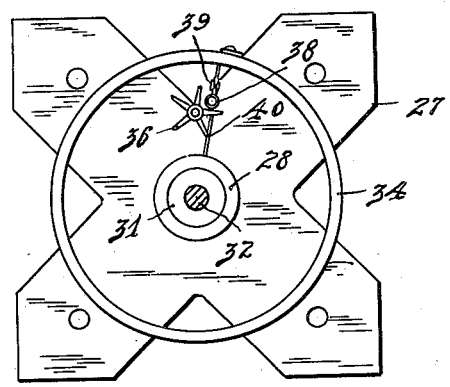
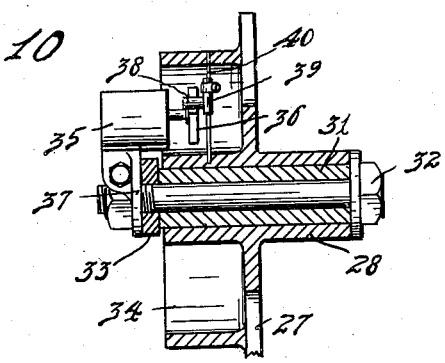
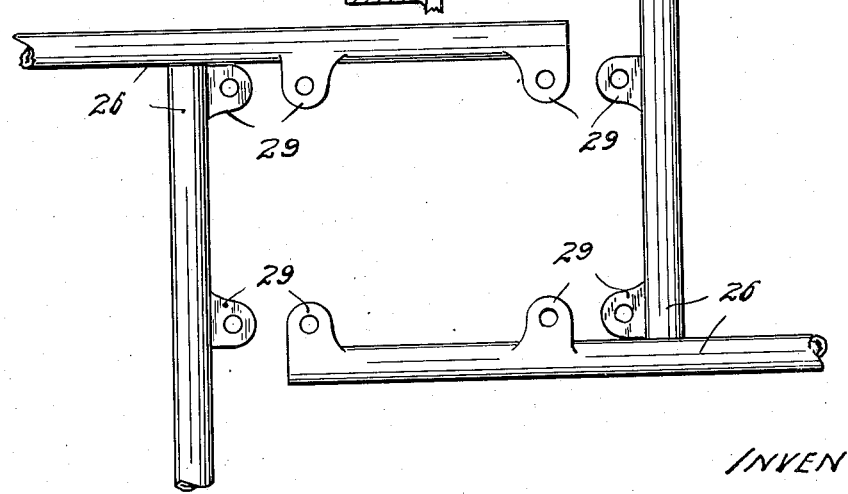
INVENTOR
Ebenhard S. Gandrud
By his Attorneys
Merchant Kilgore

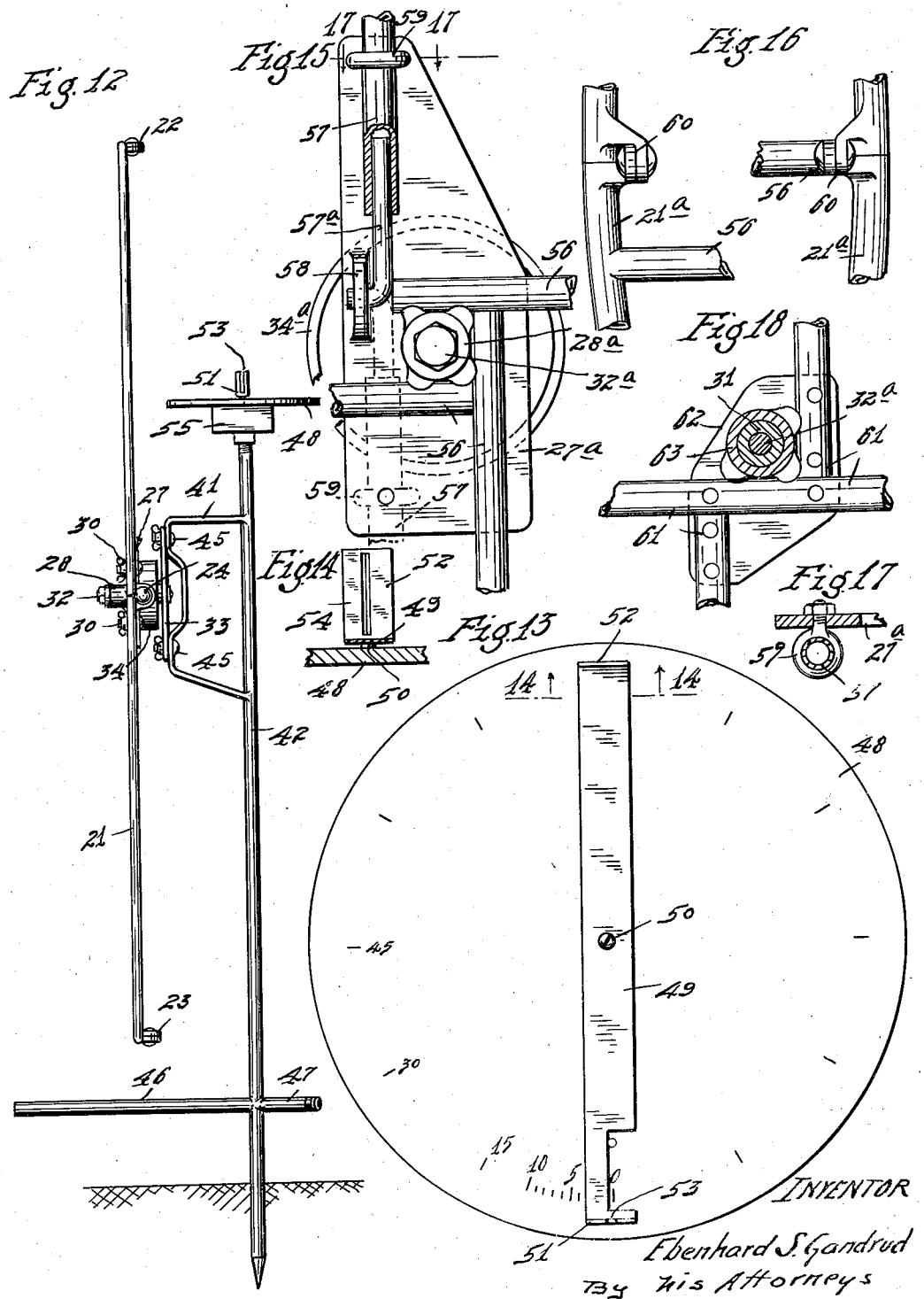

Patented June 28, 1938

2,121,867

UNITED STATES PATENT OFFICE 2,121,867

LAND MEASURING INSTRUMENT

Ebenhard S. Gandrud, Pipestone, Minn.

Application August 20, 1936, Serial No. 96,977

5 Claims. (Cl. 33—141)

My present invention provides an extremely simple and highly efficient low cost land measuring or surveying instrument. Generally stated, the invention consists of the novel devices, combinations of devices and arrangement of parts hereinafter described and defined in the claims. More specifically stated, my invention, in its preferred form, involves a measuring wheel, a register of the rotations thereof, a transit, and a handle bar or device that serves as a handle for running the wheel over the ground and as a staff for supporting the transit. These several instrumentalities are combined in such a way that the instrument may, without addition or substitution of parts or readjustments the one in respect to the other, be used at will for the lineal measuring of the land or for the ordinary work performed by the use of a surveyor's transit.

The instrument is accurate enough for ordinary purposes, and will be found very generally useful for the quick and substantially correct measuring and surveying of land.

The measuring wheel may be made in various sizes, but for general purposes, will have a circumference of sixteen and one-half feet or one rod, which is the customary dimension of measurement used in land surveying. For some purposes, the wheel may be made as an integral or non-folding member; but as an additional feature of novelty, the wheel may be made foldable so that it will occupy a less space in shipment or storage.

Commercial forms of the device are illustrated in the accompanying drawings wherein like characters indicate like parts throughout the several views.

Referring to the drawings:

Fig. 1 is a right side elevation showing the complete measuring instrument;

Fig. 2 is a detail in section on the line 2—2 of Fig. 1;

Fig. 3 is a fragmentary view showing a hinge joint found in the vicinity of the line marked 3—3 on Fig. 1;

Fig. 4 is a fragmentary section on the line 4—4 of Fig. 1;

Fig. 5 is a plan view of the parts shown in Fig. 1, except that the head of the transit has been removed from the combined staff and operating handle;

Fig. 6 is a section taken on the line 6—6 of Fig. 1, some parts being broken away and the parts being shown on a larger scale than in Fig. 1;

Fig. 7 is a detail with some parts sectioned on the line 7—7 of Fig. 6;

Fig. 8 is a left side elevation of the wheel hub and immediately associated parts, some parts being broken away;

Fig. 9 is a view corresponding to Fig. 8, but with the wheel spokes and various other parts removed so as to show the star wheel of the counter and the co-operating tappet carried by the wheel hub;

Fig. 10 is a section taken on the line 10—10 of Fig. 8, some parts being shown in full;

Fig. 11 is a fragmentary view in side elevation showing the wheel spokes separated from the wheel hub and disconnected, the one from the other;

Fig. 12 is an elevation showing the instrument as it will appear when the combined staff and operating handle is set vertically so as to present the transit for use;

Fig. 13 is a plan view of the transit;

Fig. 14 is a fragmentary section taken on the line 14—14 of Fig. 13;

Fig. 15 is a fragmentary view illustrating the modification of the wheel hub and spokes;

Fig. 16 is a fragmentary view showing the rim and spoke structure of the modification illustrated in Fig. 15;

Fig. 17 is a transverse section taken on the line 17—17 of Fig. 15; and

Fig. 18 illustrates a still further modification of the wheel hub.

In the structure illustrated in Figs. 1 to 14, inclusive, the wheel is arranged to be folded into quadrants or four sections, and this structure will first be described. The wheel rim 21 is made up of four sections connected by hinge joints 22, 23, 24 and 25, which hinges are located 90° apart. The hinges 22, 23 and 24 are alike and project from the same side, while the hinge 25 projects from the opposite side, this being done for a purpose which will hereinafter appear. The wheel is shown as provided with four spokes 26 that are offset from lines radiating from the axis of the wheel and are brought together in an offset rectangular arrangement, and these offset inner ends are rigidly but detachably secured to the projecting flange 27 of the wheel hub 28. The flange 27, as shown, has four projecting arms, but of course the structure may be varied. The wheel rim sections 21 and spokes 26 are preferably steel tubes. The spokes 26 at their inner ends, see particularly Fig. 11, are provided with projecting lugs 29 through which and the hub flange 27 nut-equipped bolts 30 are applied.

The wheel hub 28 is shown as directly journaled on a tubular spindle 31 which, by a nut-equipped bolt 32, see particularly Fig. 10, is rigidly clamped to a bar 33 that is supported as presently to be described. A flange 27 of the wheel hub is shown as provided with an annular flange 34 that affords a weed guard for a counter star wheel which is positioned within said weed guard, see particularly Fig. 10. This counter may be, and preferably is, of the well-known type used in connection with bicycles, and for the purpose of this case, it is only desirable to designate the counter casing 35 and its star wheel 36. The casing 35 has a flange 37 that is rigidly clamped to the bar 33 by the nut of the bolt 32.

For operating the star wheel and through the mechanism, recording each rotation of the measuring wheel, the wheel carries a tappet. This tappet, as shown, is in the form of a stud or finger 38, see Figs. 9 and 10, carried by a small sleeve 39 that is mounted for radial adjustments on a rod 40, the ends of which are secured to the wheel hub and to its flange 34.

Directing attention now particularly to Figs. 5, 6, 7 and 12, it will be noted that the bar 33 which acts as a bridge bar is rigidly but detachably secured to the yoke-like projection 41 of a staff or rod 42 that serves as a combined staff for the transit and an operating handle for the measuring wheel. As shown, this bar 33 has a short open slot 43 in one end and a long open slot 44 at its other end and that nut-equipped bolts 45 are passed through the yoke 41 and through the said slots 43 and 44. With this arrangement to remove the bar 33 from the yoke 41, it is only necessary, after loosening the nut-equipped bolts 32, to move the bar downward in respect to Fig. 7 far enough to disconnect the upper end of the bar from the upper bolt, and then to withdraw the bar from the lower bolt, this being done without entirely removing the nuts from the bolts.

The rod or staff 42 is provided with a long lateral projecting arm 46 located outward of the rim of the wheel. The lower end of the staff 42 is preferably sharpened so that it may be easily forced into the ground. The staff is also provided with a secondary or shorter arm 47 that projects in an angle to the arm 46 so that when the staff is forced into the ground far enough to engage the arms 46 and 47 with the ground, the staff will be held in a vertical position, provided of course that the ground is level. The staff 42 and arms 46 and 47 like the rim and spokes of the wheel are preferably made from steel tubes.

The transit head is made up of a dial 48 with a vernier scale, and a sighting bar 49 pivoted to the axis of the dial at 50. As preferably designed, this bar 49 has upturned ends 51 and 52 formed with sighting slots, respectively 53 and 54.

The dial shown is rigidly secured to a hub 55 that is internally threaded to fit the threads on the upper end of the staff 42 and also to fit similar threads on the end of the stub arm 47. When the transit is to be used, it will be applied to the upper end of the staff when the lower end of the latter is forced into the ground; but when out of use, it may be, and at certain times will be, applied to the stub arm 47.

Figs. 15, 16 and 17 show hub and rim portions of a wheel that will operate like the wheel already described, but which will fold only into semi-circular arrangement. This wheel has three spokes 56, the inner ends of which are rigidly secured to the flange 27a of a wheel hub 28a and has a fourth spoke 57, the inner end 57a of which is hinged to an ear 58 on the hub flange 27a. The hinged spoke 57 is adapted to be rigidly locked to the flange plate 27a by a nut-equipped eye bolt 59, see Figs. 15 and 17. The wheel hub 28a is adapted to be mounted in the same manner as the previously described wheel. Also, as shown in Fig. 15, the hub flange 27a is provided with an annular weed guard 34a. The rim of this two-section wheel is made up of semi-circular rim sections 21a that are connected at diametrically opposite points by hinge lugs 60, see Fig. 16.

Fig. 18 shows the hub of the measuring wheel which will have an integral or continuous rigid rim supported by spokes 61 that are rigidly secured to the flange 62 of a hub 63, and which hub is adapted to be supported in the same manner as the wheels previously described.

The use and operation of the surveying instrument is probably obvious from the foregoing statements, but may be briefly summarized as follows: The surveyor or operator walking along the line to be measured pushes the wheel ahead of him, and this wheel under the ground friction, due to its weight, will register one rod for each rotation of the wheel and which, of course, represents one rod of travel of the operator. The wheel is adapted to travel through high grass, weeds, and over roughage without slippage, and hence, accurately record each rod of travel. Obviously, if the wheel were made in other dimensions than for rod measurement, it would record the unit of travel represented by a revolution of the particular wheel.

The weed guard or hub flange 34 prevents high grass or weeds from getting tangled up with the star wheel 36 and tappet 38. When the transit is to be used, the staff is, as already stated, forced into the ground and set in a vertical position so that the dial 48 will be level, or approximately level, and then the sighting bar 49 may be used in the manner well-known to surveyors. The above statements as to operation apply to all of the several forms of the wheel illustrated. Also, in all of the wheel structures illustrated, the wheel may be readily disconnected from the staff or bar 42 simply by disconnecting the bridge bar 33.

The four-section wheel illustrated in Figs. 1 to 14, inclusive, may be readily folded into a quadrantal assembly, as follows: The four bolts 30 are first removed which disconnects the inner ends of the wheel spokes from the wheel hub flange. Then the wheel will be folded into semi-circular formation by folding of the wheel rim on the hinges 22 and 23. This turns the hinge 25 upside down or places the same on the same side of the semi-circular assembly so that the wheel may then be folded into quadrantal form by movement on the hinges 24 and 25. The wheel thus disassembled will, of course, occupy a very small space as compared with the total diameter of the wheel.

The modified wheel illustrated in Figs. 15 and 16 is adapted to be folded only into semi-circular formation. To accomplish this folding, it is only necessary to remove the nut of the clamping eye bolt 59, thereby releasing the spoke 57 from the hub flange 27a so that the wheel can then be folded on the hinges 60. Here it will be noted that one of the spokes 56 is approximately aligned with the hinges 60 and with the pivotal connection between the hinge lug 58 and the end portion 57ª of the spoke 57, which arrangement permits the free folding of the wheel into segmental formation.

Of course, the rigid wheel structure illustrated in Fig. 18 is not capable of folding, and hence, the wheel always remains at its full size.

What I claim is:

1. In an instrument of the kind described, a staff having a laterally offset yoke, a bar rigidly but detachably secured to said yoke, a spindle secured to said yoke, a ground engaging wheel journaled to said spindle, a register supported by said bar, said wheel having a tappet for operating said register to indicate the distance travelled by the wheel, said wheel being directly journaled to said bar and said bar being rigidly but detachably secured to said yoke.

2. In a land-measuring instrument, a ground-engaging wheel comprising a hub, rim and spokes, said rim being made up of a plurality of hingedly connected sections, certain of said spokes being detachable from said hub and movable with the respective rim sections, whereby said wheel may be folded into compact segmental form within a segment approximately coextensive with a rim segment.

3. In a land-measuring instrument, a ground-engaging wheel comprising a hub, rim and spokes, said rim involving four segments hingedly connected, the said spokes being four in number, one rigidly connected to each of said rim segments, and at least three of said spokes being detachable from said hub, the said wheel thereby being capable of being folded into compact segmental form within a segment approximately coextensive with a rim segment.

4. The structure defined in claim 2 in which said wheel has four spokes connected to said hub in overlapping arrangement tangentially to an imaginary circle struck from the axis of the hub, at least three of said spokes being detachable from said hub.

5. The structure defined in claim 3 in which said wheel has four spokes connected to said hub in overlapping arrangement tangentially to an imaginary circle struck from the axis of the hub, at least three of said spokes being detachable from said hub.

EBENHARD S. GANDRUD.